United States Patent
King et al.

(10) Patent No.: US 10,184,819 B1
(45) Date of Patent: Jan. 22, 2019

(54) LIQUID LEAK MEASUREMENT SYSTEM

(71) Applicants: Shawn Anthony King, Windermere, FL (US); Edward Kenneth Wilshire, Jr., Orlando, FL (US); Juan Fransico Mata Schwank, Orlando, FL (US); James Lewis King, Winter Garden, FL (US)

(72) Inventors: Shawn Anthony King, Windermere, FL (US); Edward Kenneth Wilshire, Jr., Orlando, FL (US); Juan Fransico Mata Schwank, Orlando, FL (US); James Lewis King, Winter Garden, FL (US)

(*) Notice: Subject to any disclaimer, the term of this patent is extended or adjusted under 35 U.S.C. 154(b) by 0 days.

(21) Appl. No.: 15/918,073

(22) Filed: Mar. 12, 2018

(51) Int. Cl.
 *G01F 23/02* (2006.01)

(52) U.S. Cl.
 CPC .................... *G01F 23/02* (2013.01)

(58) Field of Classification Search
 CPC .............................. G01F 23/02; G01M 3/3245
 USPC ....... 116/227; 73/170.17, 290 B, 290 R, 323
 See application file for complete search history.

(56) References Cited

U.S. PATENT DOCUMENTS

| | | | | |
|---|---|---|---|---|
| 3,889,523 A * | 6/1975 | Nolte | .................. | G01F 23/2966 73/290 V |
| 4,412,447 A * | 11/1983 | McMahan | ............... | G01W 1/14 116/227 |
| 5,038,606 A * | 8/1991 | Geschwender et al. | ...................... | G01W 1/14 73/170.17 |
| 5,065,623 A * | 11/1991 | Wilcox | ................... | G01F 23/04 116/227 |
| 5,551,290 A * | 9/1996 | Spiegel | ................... | G01F 23/56 73/311 |
| 5,734,096 A * | 3/1998 | McGuigan et al. | .... | G01M 3/02 73/49.2 |
| 6,532,814 B2 * | 3/2003 | Bromley | ............. | G01M 3/3245 73/290 R |
| 7,004,011 B1 * | 2/2006 | Spiegel | ................... | G01F 23/56 73/290 R |
| 8,220,482 B1 * | 7/2012 | DeVerse et al. | .......... | E04H 4/12 137/392 |
| 9,410,336 B2 * | 8/2016 | DeVerse | ................... | E04H 4/12 |
| 9,464,959 B2 * | 10/2016 | Marino | .................... | G01M 3/02 |
| 9,945,754 B2 * | 4/2018 | Lenart | ...................... | E04H 4/148 |

(Continued)

FOREIGN PATENT DOCUMENTS

| FR | 2986069 A1 * | 7/2013 | ............. | G01M 3/04 |
|---|---|---|---|---|
| NL | 8902952 A * | 6/1991 | ............ | A01G 27/008 |

*Primary Examiner* — R. A. Smith
(74) *Attorney, Agent, or Firm* — Patent CEO, LLC; Phillip Vales

(57) ABSTRACT

A container having a flow end with an associated hole in a surface that matches a cutout in a cover that is inserted in the flow end. Rotation of the cover with the container aligns the hole with the cutout in the cover; to allow fluid flow when the system is placed downwards into a liquid body. When the liquid level in the container matches that in the liquid body, a base is inserted within a resting end of the container thereby restricting liquid flow in or out of the system. As the container is removed from the liquid, the cover at the flow end is twisted so that the hole in the container is covered thereby creating a closed system, blocking any fluid movement. The system is placed on the resting base and stored to compare at a later time with the Liquid Containment System.

20 Claims, 2 Drawing Sheets

(56) References Cited

U.S. PATENT DOCUMENTS

| | | | |
|---|---|---|---|
| 2004/0261516 A1* | 12/2004 | Simpson | G01W 1/14 73/170.17 |
| 2008/0223126 A1* | 9/2008 | Geschwender | G01W 1/14 73/170.17 |
| 2017/0167944 A1* | 6/2017 | Lenart | G01M 3/20 |

* cited by examiner

US 10,184,819 B1

LIQUID LEAK MEASUREMENT SYSTEM

FIELD OF THE INVENTION

The present invention relates to devices used in the liquid containment industry. More particularly, the present invention relates to devices that are able to measure a change in the liquid level of a containment system.

BACKGROUND OF THE INVENTION

Pools are formed using various materials such as tile, concrete, fiberglass, stone and more. They are typically filled with a mixture of water and chlorine that helps maintain it free from bacteria and other organisms that can develop overtime. However, the pool is of no use if its primary purpose, that of supplying an enjoyable water experience, is damaged or degraded overtime.

Thus, owners provide regular necessary maintenance to clean it of any leaves, stones, trash and other debris that gather in the water or settle to the bottom thereof. Additionally, cracks or holes develop in the underlying structure permitting leaks to the surrounding area resulting in a lower water level therein. Monitoring the water level is consequently an important periodic activity to ascertain the needs thereof.

A user typically marks the tile or concrete surface near the water's edge with a marker so as to establish a baseline for measuring the current state of the pool. After some time has passed, the water level is checked once again and a secondary mark is made near the first mark. Then an evaluation is made as to whether the amount of water disappearing from the pool is coming from regular evaporation or does it appear that a crack, hole or more serious fault has developed in the underlying structure of the pool.

This system has some problems in that it lends itself to losing the first mark as water can splash and the first mark can thusly be easily removed from the water's edge. Of course, this would require remarking the tile or concrete and staring over, costing time for the technician to come out to the house and or homeowner time. Finally, due to various surface types in pools, the creation of a mark can be very difficult.

Accordingly, there is a need for a solution to the aforementioned problems that is stable, cost effective and easy to deploy in the field.

SUMMARY OF THE INVENTION

The present invention overcomes the deficiencies of the known art and the problems that remain unsolved by providing a Liquid Leak Measurement System.

In accordance with one embodiment of the present invention:

A Liquid Leak Measurement System comprising:
a container having
an opening at a flow end thereof and
a wall opening proximal to the flow end in a surface of the container
a resting end of the container opposite the flow end thereof;
wherein a selectively actuatable air allowable cover is disposed at the flow end: and
wherein a selectively actuatable air allowable base is disposed at the resting end; characterized in that the flow end is oriented downward when a liquid is being drawn inwards through the wall opening, and that the resting end is oriented downwards when measurements are taken.

In another aspect, further comprising:
a scale on a surface of the container.
In another aspect, further comprising:
the selectively actuatable air allowable cover inserted within the opening at the flow end of the container.
In another aspect, further comprising:
wherein the selectively actuatable air allowable cover further comprises a cutout in the cover.
In another aspect,
wherein the cutout matches the size and shape of the wall opening in the container.
In another aspect, wherein the system further comprises:
the selectively actuatable air allowable cover inserted within the first opening at the flow end of the container.
In another aspect, further comprising:
another opening at the resting end of the container.
In another aspect, further comprising:
the selectively actuatable air allowable base attached to the another opening at the resting end of the container such that the selectively actuatable air allowable base has no opened liquid passageway.
In another aspect,
wherein the selectively actuatable air allowable base further comprises a large flat rim.
In another aspect, wherein the wall opening is from a set of wall openings comprising: a perforation, a cutout, a hole, a cutout from an edge of the container to a predetermined point on the container surface.

A liquid level measurement system comprising:
a container having a flow end and a resting end;
a removable cover associated with the flow end of the container and
a wall opening in a container surface that is proximal to the flow end of the container; and
a removable base associated with the resting end of the container; characterized in that the flow end is oriented downward when a liquid is being drawn inwards through the wall opening, and that the resting end is oriented downwards when measurements are taken.

In another aspect, further comprising:
the removable base attached to the resting end of the container such that the removable base has no opened passageway that permits entry of a liquid into the container.
In another aspect, wherein the removable cover is attached to the flow end of the container.
In another aspect, wherein the removable base has a large flat rim and a body matching an inner surface of the resting end of the container.
In another aspect, wherein the removable cover has a cutout.
In another aspect, wherein the removable cover has a cutout resembling the hole in size.
In another aspect, wherein the wall opening is from a-set of wall openings comprising: a perforation, a cutout, a hole, a cutout from an edge of the container to a predetermined point on the container surface.

A liquid level determination kit comprising:
a container having a flow end and a resting end with a wall opening on the container surface and a scale also on the container surface;
a selectively actuated air allowable cover at the flow end of the container; and
a selectively actuated air allowable base at the resting end of the container;
characterized in that the flow end is oriented downward when a liquid is being drawn inwards through the wall opening, and that the resting end is oriented downwards when measurements are taken.

In another aspect, further comprising:

the selectively actuated air allowable cover attached to the flow end near the wall opening.

In another aspect, further comprising:

a cutout in the selectively actuated air allowable cover located in rotational association proximity with the wall opening on the container surface.

In another aspect, further comprising:

the selectively actuated air allowable base inserted within the resting end such that the selectively actuated air allowable base has no built in passageway.

In another aspect, wherein the selectively actuated air allowable base further comprises a flat rim.

In another aspect, wherein the wall opening is from a set of wall opening comprising: a perforation, a cutout, a hole, a cutout from an edge of the container to a predetermined point on the container surface.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

General

A Liquid Leak Measurement System has two removable inserts at opposing ends of a container. The container has an opening at one end of the container, which is known as the Flow End and another opening at another end of the container known as the Resting End. The container becomes a closed system, blocking any air, gas or liquid movement when both inserts are in place and the Flow End insert is positioned to block a wall opening in the container wall.

Water Collection

Figure 2:
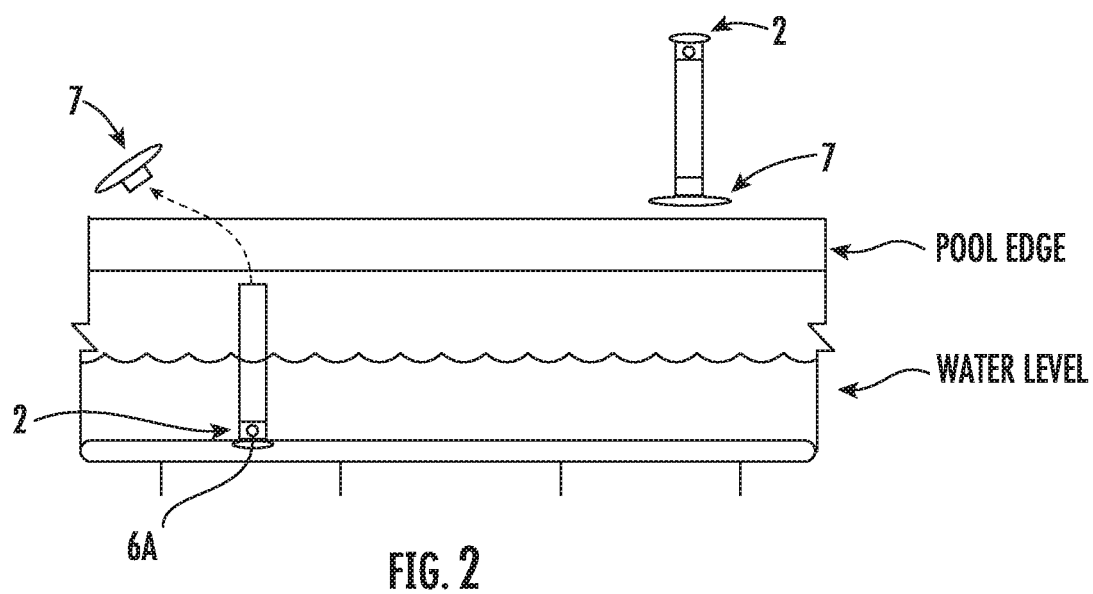
FIG. 2 presents a view of the use of A Liquid Leak Measurement System within a pool for water gathering and atop a pool edge for water level measurement in an embodiment herein disclosed.

The Flow End of the container is inserted into the liquid until it rests on the surface of the subject area. At this time, the insert in the Flow End is positioned to allow flow through the opening in the container wall by lining up the wall opening in the container with the cut-out in the insert (as shown in FIG. 2). The opposing end, noted as the Resting End, does not have an insert placed therein at this time; this permits air to flow out therethrough as water enters the opening in the Flow End. Liquid flow continues until the level equalizes the level in the container with the level in the subject area.

Once equilibrium between the subject area liquid and the container liquid, two steps must be taken to ensure that the contents of the container are protected from water loss during movement as well as storage. First, the insert is placed into the container in the Resting End. At this point, the unit may be removed from the water, as this insert will restrict the flow in or out of the Liquid Leak Measurement System. Secondly, with the system removed, the insert (or cover) in the Flow End is rotated to close the opening in the container wall, thereby creating a closed system, blocking any air, gas or liquid movement. Now, the Liquid Leak Measurement System is placed on the Resting End insert (or base as shown in FIG. 2 right side of the drawing at top). A broad base rim which is integrally formed with the insert placed in the Resting End provides stability for storage atop a surface. After a period of time, the Liquid Leak Measurement System may be reinserted into the water containment system to determine any change in level.

Level Measurement

A Resting End opening is disposed at a bottom of the system when it is deployed for liquid level measurement (as shown in FIG. 2 right side) to take advantage of an inserted base. With the Liquid Leak Measurement System placed on the base insert of the Resting End, a measurement is noted on the container markings depicted as item 5 on FIG. 1A.

Exemplary Embodiment

Figure 1A:
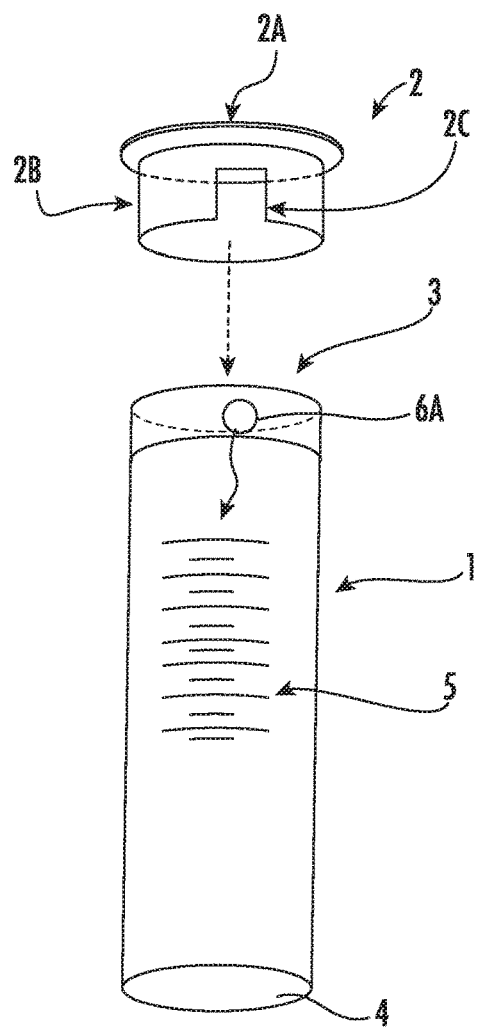
FIG. 1A presents a front view of a portion of A Liquid Leak Measurement System in an embodiment herein disclosed disposed for level measurement.

FIG. 1A presents a front view of a portion of A Liquid Leak Measurement System in an embodiment herein disclosed disposed for level measurement. A Liquid Leak Measurement System is primarily a container 1 with a cover 2 on one side and a base on another side (shown in other views) having various other unique features described as follows. The container 1 is most generally any shaped container; more particularly, the shape would be cubic, spherical, curved, cylindrical, elliptical, rhomboid, pyramidal, irregular or regular polygonal and so forth.

The container 1 is shown as a circular shaped cylinder having a Flow End 3 at one end thereof and a Resting End 4 at an opposite end of the Flow End 3. The container 1 has various integral curvilinear markings 5 that are useful in facilitating the primary task of the container, namely, the measurement of water level height within a pool or other body of water. These curvilinear markings 5 are disposed on the outside and or inside surface of container 1 and run parallel to the Flow End 3 and the Resting End 4 as they proceed sequentially down the longitudinal side of the container 1 inner or outer surface (or perpendicular to the longitudinal side of the container 1). Additionally, the container 1 has a wall opening 6A in the container 1 surface near the the Flow End 3. However, it should be understood that the wall opening 6A does not actually reach to the edge of the container 1 but only is proximal thereto.

Assisting the container 1 in performing the function of measuring the pool water level height is a cover 2 that is inserted within Flow End 3. The cover 2 has an integral top rim 2A, a body 2B and a cutout 2C. The cover 2 body 2B shape and size are formed so as to match the general shape and size of the inner surface of the container 1 in the region of the Flow End 3 so as to ensure a snug fit therewith. In this embodiment, the cover 2 has a top rim 2A that extends out and somewhat over the edge thereof; it also has a body 2B formed as a thin circular surface with a smaller diameter than the top rim 2A. This circular surface integrally extends out from the bottom of the top rim 2A. The rim 2A is optionally removed in favor of having only a body 2B.

A cutout 2C is the final component of the cover 2; this cutout 2C extends from the lowest portion of the cover 2 body 2B until a predetermined portion upwards therein. This cutout 2C is disposed laterally on the body 2B thereby facilitating the flow of water from a wall opening 6A in the surface of the container 1. Thus, when cutout 2C and wall opening 6A are concentrically matched by a user appropriately twisting the cover 2, maximal water flow is achieved into container 1.

In this regard, a user would place the container 1 and system components within a pool on a step or similar surface therein and invert the container 1 so that the wall opening 6A, cover 2 and cutout 2C are disposed at the bottom thereof; in other words, the Flow End is disposed at the bottom. In this step, it should be understood also that a base 7 shown in FIG. 1B would also be removed from the other opening (the Resting End) so that air can vent out of the system. Thus, water rushes into the container 1 until it reaches its greatest height. Then a user would place the base 7 into the resting end and remove container 1 and cover 2 insert from the water. Next, a user would cap the flow off by twisting the cover 2 until the wall opening 6A is covered by a full side of the cover body. This has the intended effect of shutting off fluid flow.

Figure 1B:
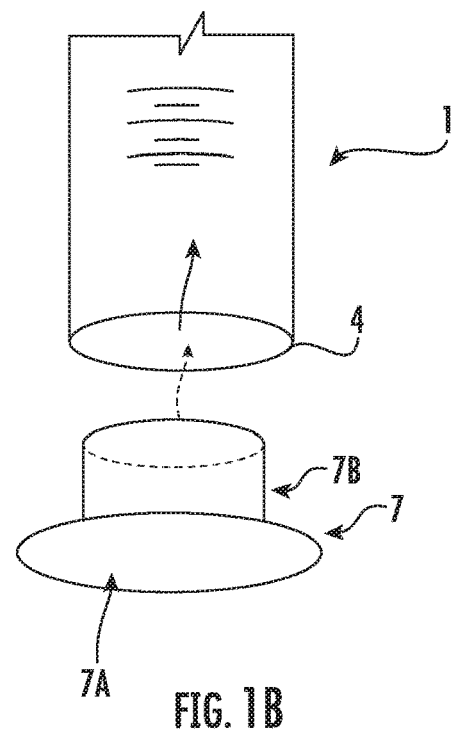
FIG. 1B presents a front view of a portion of A Liquid Leak Measurement System in an embodiment herein disclosed disposed for level measurement.

FIG. 1B presents a front view of a second portion of A Liquid Leak Measurement System in an embodiment herein disclosed disposed for level measurement. Here the second end of the container 1 has a Resting End 4 for insertion therein of the base 7. This base 7 has an integral thin circular surface forming a circular body 7B that fits snugly into the Resting End 4; the base 7 also has a much larger integral rim 7A permitting the entire system to stand on a floor, tile, or concrete step in a pool upon the back of this rim 7A when it is properly placed atop a stable surface.

FIG. 2 presents a view of the use of A Liquid Leak Measurement System within a pool (left of figure) for water gathering and atop a pool edge (right in figure) for water level measurement in an embodiment herein disclosed. First, a user inserts the cover 2 into a Flow End 3 of the container 1 and ensures that the Resting End of the container 1 is unobstructed; in other words, the base 7 is not inserted therein at this point.

To measure liquid level he or she concentrically disposes the cutout 2C in the cover 2 with the wall opening 6A in the container by twisting the cover 2 until they are concentric or as close to that as practical; at this point, the user then places the container 1 within the liquid of a pool on a step or similar surface therein and inverts the container 1 so that the cover 2, cutout 2C, and wall opening 6A are disposed at the bottom thereof. Water rushes into the container 1 until it matches the water level outside of the container 1. Then a user would place the base 7 into the resting end and remove container 1, cover 2 and base 7 insert from the water. As it is removed from the liquid, the user would cap the flow off by twisting the cover 2 body 2B until a closed section of body 2B can cover the wall opening 6A; this has the intended effect of shutting off any fluid flow during handling. Thus, when a user wishes to stop the flow he simply turns the cap and ends it.

Shown at the right side of the drawing in FIG. 2 is how the user places the completed system atop a ledge, step or other surface outside of the water for reading the scale on the container 1. As the user withdraws container 1 and cover 2 from the water, the base 7 body is inserted within the Resting End 4 for providing a stable support outside of the water for measuring the scale on the outside of the container 1. Then the completed and closed system is inverted and placed atop the base 7 for a reading.

Figure 3:
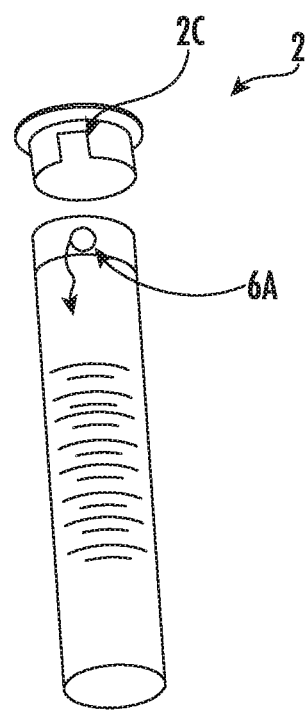
FIG. 3 presents a front view of a portion of A Liquid Leak Measurement System in another view in an embodiment herein disclosed.

FIG. 3 presents a front view of a portion of A Liquid Leak Measurement System in another view of an embodiment herein disclosed. In this view, there is a cover 2 having a cutout 2C within its body from the bottom edge of the circular surface forming the body 2B of cover 2 to a predetermined point in the body 2B of the cover 2. At the edge of the container 1 first mouth, there is a corresponding wall opening 6A that is used for concentric disposition with the cutout 2C for water flow therethrough.

The following example assumes that the cover 2 is oriented whereby it is pre-inserted into the end with the cutout 2C, and wall opening 6A disposed centered and adjacent with each other. First, a user would place the container 1 (without a base inserted into the Resting End to permit air exhaust) within a pool on a step or similar surface therein and invert the container 1 so that the cutout 2C and wall opening 6A are disposed at the bottom thereof. Water rushes into the container 1 and then the water level reaches the same level within the container 1 as it is externally.

Of course, when one would want to place the container 1 on a surface outside of the water, the system is first completed and closed by inserting a base 7 into the Resting End 4 that is at this point at the top of the system. When a user removes the system from the water, then a user would cap the flow off by twisting the cover 2 until a solid side of the cover body 2B blocks fluid flow from the cutout 6A in container 1. The entire system is inverted so that the base 7 is at bottom to take advantage of its wide rim upon a surface; then a reading is taken as to the current water level in the pool or other liquid environment.

The above-described embodiments are merely exemplary illustrations of various implementations set forth for a clear understanding of the principles of the invention. Many variations, combinations, modifications or equivalents may be substituted for elements thereof without departing from the spirit and scope of the invention. Therefore, it is intended that the invention not be limited to the particular embodiments as disclosed, but that the invention will include all the embodiments falling within the scope of the appended claims.

What is claimed is:

1. A Liquid Leak Measurement System comprising:
a container having
an opening at a flow end thereof and
a wall opening proximal to the flow end in a surface of the container
a resting end of the container opposite the flow end thereof;
wherein a selectively actuatable air allowable cover is disposed at the flow end; and
wherein a selectively actuatable air allowable base is disposed at the resting end; characterized in that the flow end is oriented downward when a liquid is being drawn inwards through the wall opening, and that the resting end is oriented downwards when measurements are taken.

2. The Liquid Leak Measurement System of claim 1, further comprising:
a scale on a surface of the container.

3. The Liquid Leak Measurement System of claim 1, further comprising:
the selectively actuatable air allowable cover inserted within the opening at the flow end of the container.

4. The Liquid Leak Measurement System of claim 3, wherein the selectively actuatable air allowable cover further comprises a hole in the cover.

5. The Liquid Leak Measurement System of claim 4, wherein the hole is a cutout from an end of a cover body to a predetermined point thereon.

6. The Liquid Leak Measurement System of claim 1, further comprising:
another opening at the resting end of the container.

7. The Liquid Leak Measurement System of claim 6, further comprising:
the selectively actuatable air allowable base attached to the another opening at the resting end of the container such that the selectively actuatable air allowable base has no opened liquid passageway.

8. The Liquid Leak Measurement System of claim 6, wherein the selectively actuatable air allowable base further comprises a large flat rim.

9. A liquid level measurement system comprising:
a container having a flow end and a resting end;
a removable cover inserted associated with the flow end of the container and
a wall opening in a container surface that is proximal to the flow end of the container; and
a removable base associated with the resting end of the container; characterized in that the flow end is oriented downward when a liquid is being drawn inwards through the wall opening, and that the resting end is oriented downwards when measurements are taken.

10. The liquid level measurement system of claim 9, wherein the removable base further comprises:
the removable base attached to the resting end of the container such that the removable base has no opened passageway that permits entry of a liquid into the container.

11. The liquid level measurement system of claim 9, wherein the removable cover is attached to the flow end of the container.

12. The liquid level measurement system of claim 9, wherein the removable base has a large flat rim and a body matching an inner surface of the resting end of the container.

13. The liquid level measurement system of claim 9, wherein the removable cover has a cutout.

14. The liquid level measurement system of claim 9, wherein the removable cover has a cutout resembling the wall opening in size.

15. A liquid level determination kit comprising:
a container having a flow end a resting end with a wall opening on the container surface and a scale also on the container surface;
a selectively actuated air allowable cover at the flow end of the container; and
a selectively actuated air allowable base at the resting end of the container; characterized in that the flow end is oriented downward when a liquid is being drawn inwards through the wall opening, and that the resting end is oriented downwards when measurements are taken.

16. The liquid level determination kit of claim 15, further comprising:
the selectively actuated air allowable cover attached to the flow end near the wall opening.

17. The liquid level determination kit of claim 15, further comprising:
a cutout in the selectively actuated air allowable cover located in rotational association proximity with the wall opening on the container surface.

18. The liquid level determination kit of claim 15, further comprising:
the selectively actuated air allowable base inserted within the resting end such that the selectively actuated air allowable base has no built in passageway.

19. The liquid level determination kit of claim 15, wherein the selectively actuated air allowable base further comprises a flat rim.

20. The liquid level determination kit of claim 15, wherein the wall opening is from a set of wall openings comprising: a perforation a cutout, a hole, a cutout from an edge of the container to a predetermined point on the container surface.

* * * * *